INVENTOR.
Laszlo Balazs

United States Patent Office 3,382,581
Patented May 14, 1968

3,382,581
SCIENTIFIC APPARATUS FOR LOCATING THE CORRECT OCCLUSION BITE IN NATURAL POSITION
Laszlo Balazs, 227 Willis Ave., 11–K, New York, N.Y. 10454
Filed June 15, 1964, Ser. No. 374,996
15 Claims. (Cl. 32—19)

ABSTRACT OF THE DISCLOSURE

Dental apparatus for determining natural occlusion in making artificial dentures having a headset with a band for insertion over the head of a patient. The band carries a pair of yoke bone indicators, each indicator having a fixed member in contact with a patient's cheekbone and having a movable plug disposable in contact with a maxillary-mandibular joint at one side of a patient's face. Signal means are also provided in each indicator operated by the plug for indicating when the bone structure at the joint expands upon tensioning the bone structure and for indicating when said bone structure is in a relaxed condition.

---

This invention relates generally to the art of dentistry and more particularly to apparatus for use in determining occlusion of a patient's dentition more accurately in a dentist's office, to result in accurate occlusion in finished artificial denture when in use by the patient.

It has been proposed heretofore, such as in U.S. Patent 2,299,285, to provide a maxillary manipulator to determine the occlusal plane of a patient. It has been recognized for such apparatus to operate properly, it is essential that the patient's facial muscles be in a relaxed condition, otherwise the natural occlusion cannot be accurately measured. It has been discovered that one of the most common causes for the malocclusion of artificial dentures is a tendency of a patient to stiffen the mandibular muscles, particularly, the condyles on one or both sides of the jaws while impression material is being set. Even though a patient may initially have his jaws in a restful, relaxed condition at some time during the critical measurement period, he may voluntarily or involuntarily bite or stiffen his musculature sufficiently to distort the impression material. The present invention solves this difficulty by monitoring the relaxed condition of the mandibular musculature during the critical period when the natural occlusion of the bite is being determined.

Heretofore, it was not possible to take an accurate bite-impression, because a scientifically determined occlusal plane in a toothless mouth could only be measurably determinable by circumstantial procedures. I have accomplished this task by constructing an apparatus which when placed on the interocclusal space, which can easily be found, will indicate every movement away from the original anatomical position by means of a lamp. In this manner it exercises a permanent visual control over every deviating movement. The apparatus is so constructed that after placing it on a patient's head, it can be precisely adjusted to the desired position so that it excludes the possibility of distortion in every case. The obtained and controlled interocclusal space at the same time indicates the actual line of the anatomical occlusal plane. Every alteration of the interocclusal space will alter the angular line of the occlusal plane, therefore it is very important, during the period of procedures, that the interocclusal space be visibly controlled. The development of the second procedure is carried out in such manner that in the position gained from the first procedure an apparatus, provided with springs and arms, is used to hold together the lower and upper parts of the jaw to compel the said upper and lower parts of the jaw to action on a vertical movement; by such movement it will not bring said jaw parts to a chewing position but rather to a biting position, and this is a rather important factor from the point of view of articulation. The apparatus is so constructed that it will secure with equal pressure the impressions prepared by the technician on both ridges of the jaw, according to the prescription required by the apparatus, and as a result it secures the fixed position of the impressions which cannot be moved under any circumstance. By the dentist's definition of a bite-impression is meant a toothless cover-plate on which there is a soft material such as wax and which is provided on the ridges of the jaw which at the occlusion constitute the touching surface. These impressions, when in use, will be so prepared that on each side there will be a tubular holder, and in these tubular holders the arm-like bars of the apparatus will be inserted one by one and on the part thus assembled is fit the externally positioned apparatus with springs. This spring apparatus can be adjusted to the desired spacing so that it may be able to carry out the biting operations. On the other hand, the arm-like rods which are in the tubular holders can carry out their movements forward and backward without being able to alter the secured laying positions. In this manner, the free play of the jaw will produce completely the desired results. Between the aforesaid biting and chewing, the difference is that in the biting the movement occurs forward and backward while in chewing it carries out the sideway movements of the articulation (chews). In the given procedure, the desired results can be secured by means of a clamp. With the results in the fixed state gained by the third procedure, it can now be determined most exactly, the centerline of the lips while the face is in anatomical position, because this center-point may be deviating from the chewing plane or from the palate.

A principal object of the invention is to provide dental apparatus in which the relative relationship of the mandibular and maxillary ridges when in relaxed normal position is accurately determined.

A further object is to provide dental apparatus of the character described provided with signaling means for indicating a non-relaxed muscular condition in a patient occurring during determination of the natural plane of occlusion.

Another object is to provide dental apparatus for use in determining natural occlusion, wherein contractors are located at a patient's condyles to monitor the relaxed condition thereof.

A further object is to provide improved occlusator apparatus, including improved means for setting and holding dental trays in a patient's mouth; improved means for measuring their relative spacing and position; and improved means for releasing the trays.

Another object is to provide dental apparatus with improved means for determining the medial point of the natural occlusal plane.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

Figure 1:
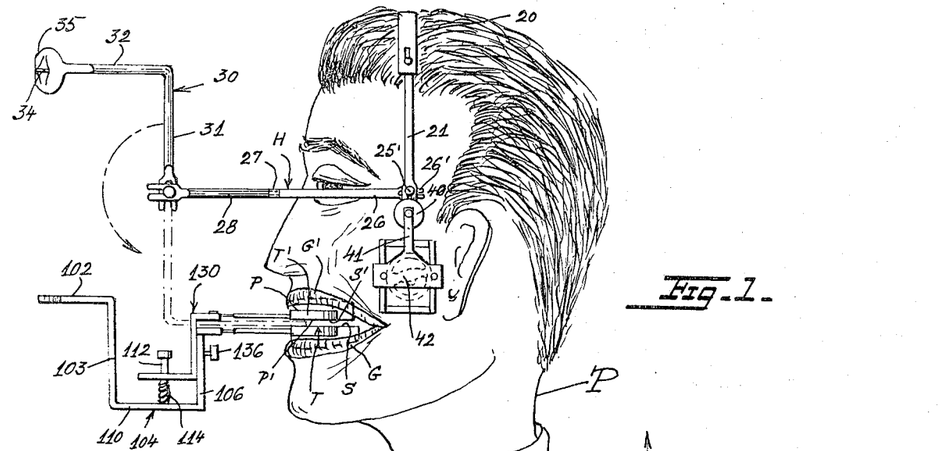
FIG. 1 is a side view of a dental apparatus embodying the invention, shown in position on a patient's head.
Figures 2, 3, 4, 5:
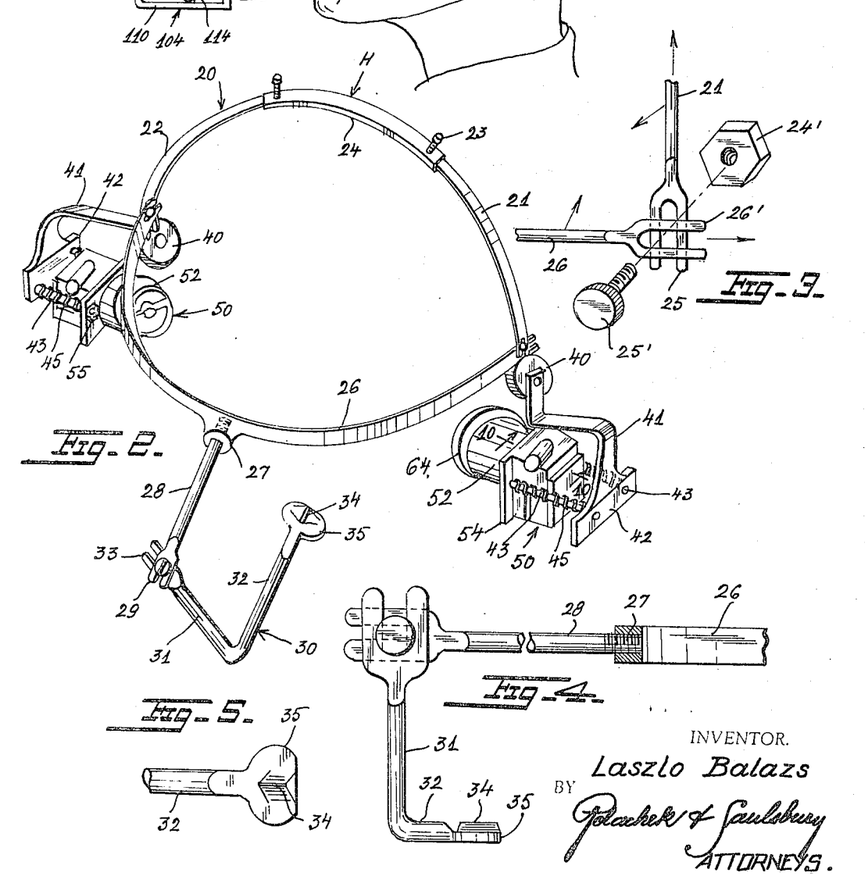
FIG. 2 is a perspective view of a headset device including an occlusal plane marker and muscular tension indicators.
FIG. 3 is a perspective detail view of the adjustable joint between the headband and oval band of the headset.
FIG. 4 is a detail view of the joint between the headband and oval band of the headset.
FIG. 5 is a detail view of the end of the crank shaft.

Referring first to FIGS. 1, 2, and 3, there is shown a headset device H including a headband 20 formed by two arcuate strips 21, 22 telescopically inserted in an arcuate sleeve 24. Setscrews 23 at opposite ends of the sleeve serve to secure proximate ends of the strips in the sleeve so that the head band fits snugly over the top of the head of a patient P. The bottom ends strips 21, 22 are located at the sides of the patient's head near upper parts of the face. Adjustably and removably connected to the bottom ends of the strips is a semicircular or oval band 26, the upper and lower edges of which are normally disposed in a horizontal plane. The adjustable connection includes a bifurcated or forked end 25 on the strip 21 and an overlapping bifurcated or forked end 26' on the oval band 26. A screw 25' and nut 24' assembly hold the ends together. Midway the ends of the oval band 26, there is formed a radially extending internally threaded socket 27. An elongated round rod 28 has one end threaded in socket 27 and extends outwardly of the band, the other end of the rod being bifurcated as indicated at 29. A crank of shaft device 30 is detachably connected to the bifurcated end of rod 28. The shaft device 30 includes angularly disposed legs 31, 32, the end of leg 31 being bifurcated as indicated at 33, the end of leg 32 being enlarged and flattened with a wedge shaped protuberance 34 thereon to form a tool or handle 35.

Referring to FIGS. 2 and 7–10, each muscular tension indicator 50 includes a casing 52 having a vertical inner partition 54. Extending between the partition 54 and the head 42 of each bracket 41 is a pair of shafts 43, one end of the shafts fixed in the head and the other end extending through holes in partition 54 with nuts 55 on the outer ends thereof. A compression spring 45 is sleeved around each shaft 43 urging the indicator inwardly. Movably mounted on the outer side of partition 54 is a rectangular casing section 57. This casing section has a wall 56 which normally abuts the outer side of partition 54. Wall 56 is held in abutment with the partition by three coil springs 58 mounted on three shafts 59 respectively and bearing on partition 54. The outer ends of the shafts are embedded in and secured to wall 56. The shafts extend inwardly of the casing 52 through holes 55 in partition 54, horizontally and parallel to each other. Secured on the inner end of one of the shafts 59 near the center of the casing is a plug 60. A second larger plug 61 is secured on inner ends of the other two shafts 59. The inner ends of the springs bear on the two plugs. Plug 60 extends beyond the plug 61. The springs 58 bias the plugs inwardly of the headset, that is, toward the opposite sides of the face of the patient P. A fixed plug 62 is secured to the inner end of the casing at flange 64. Plugs 60 and 61 can move in and out with respect to the fixed plug 62, on shafts 59.

Figures 6, 7, 8, 9, 10, 11:
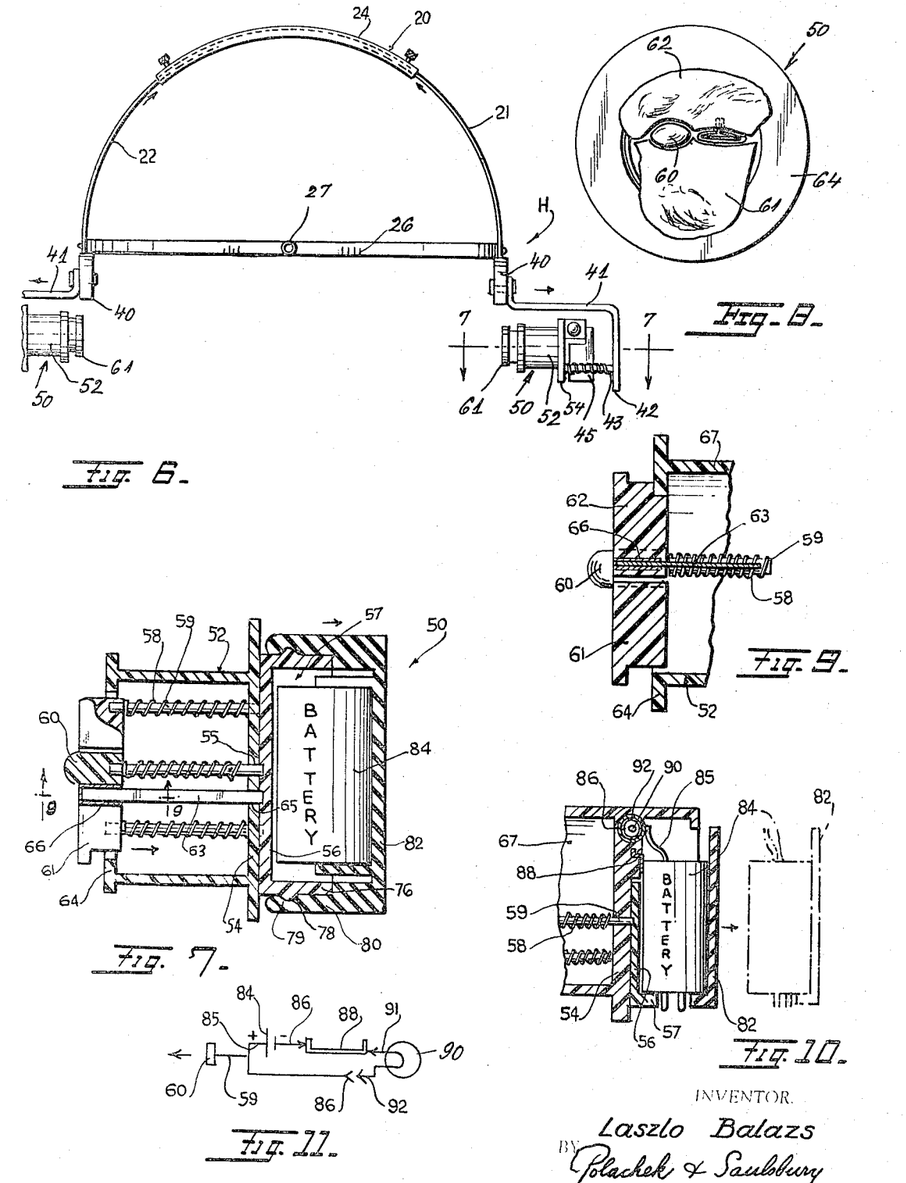
FIG. 6 is a front view of the device of FIG. 2, parts being shown broken away and parts being omitted.
FIG. 7 is a horizontal sectional view taken on the line 7—7 of FIG. 6.
FIG. 8 is an end view of a muscular tension indicator.
FIG. 9 is a horizontal sectional view taken on the line 9—9 of FIG. 7.
FIG. 10 is an enlarged vertical sectional view taken on the line 10—10 of FIG. 2, through a muscular tension indicator.
FIG. 11 is a diagram of the electric circuit of a muscular tension indicator.

In order to insure that the shafts 59 remain parallel and do not twist, there is provided a guide bar 63 which is secured at its outer end to wall 56. The bar moves through a hole 65 in partition 54. The inner end of the bar is slidably engaged in a flat tubular member 66 embedded in the fixed plug 62.

Extending outwardly of wall 56 and forming part of casing section 57 are vertical opposing side walls 76 having vertical ridges 78 on which engage grooves 79 in side walls 80 of a casing cover 82. The walls 80 are flexible so that they can be snapped on and off of walls 76. A battery 84 is removably seated in cover 82. This battery has a positive terminal 85 in the form of a spring tab which contacts a fixed cylindrical metal lamp socket 86 when the cover and battery are in place on the casing as best shown in FIG. 10. The negative terminal or case 84 of the battery contacts a fixed electrical contact element 88. The socket 86 supports a removable electric lamp bulb 90. The bulbs 90 are visible in both indicators 50 at the front of the headset. The socket 86 is securely mounted at the top of the casing 52 in a fixed position. The contact element 88 terminates at the rear end of the casing to contact the central terminal of the bulb 90. The batteries are replaceable and refillable.

FIG. 11 shows the electric circuit. Terminal 91 of the bulb 90 is in contact with element 88 which in turn contacts the negative terminal 86 of the battery 84. The positive terminal 85 of the battery contacts socket 86 into which terminal or base 92 of the bulb is seated. Thus the lamp bulb 90 is energized and lighted while the battery and cover are seated on the casing section 57. If the plug 60 and/or plug 61 are retracted or moved outwardly of the patient's face and toward casing 52 while the fixed plug 62 remains bearing on the patient's face then casing section 57 will move outwardly away from partition 54. This will move the battery and cover outwardly and break the electrical connection between the battery casing 86 and contact element 88, and between the battery terminal 85 and lamp socket 86.

The exposed side of the fixed upper plug 62 is shaped so that it will normally bear on a cheekbone. The lower plug 61 is shaped so that it will bear on the mandibular musculature, while the plug 60 projects inwardly underneath the cheekbone to contact the mandible-maxillary joint or the condyle point.

The indicators 50 are arranged so that they will move in or out on shafts 43 so that the plugs will assume proper snugly seated positions at opposite sides of the patient's face. If the patient's jaw muscles are relaxed, plugs 60 and 61 will be fully extended away from partition 54. If the patient should tense his mandibular musculature at both sides of his face, then the natural expansion of the muscles at the joints will move both of the plugs 60 and may also move either or both of the plugs 61 outwardly. The outward movement of the plugs causes casing sections 57, covers 82 and batteries 84 to move outwardly and both lighted lamps 90 will be extinguished. The dentist will thus be alerted and can instruct the patient to relax before making the critical, precise measurements required in determining the location of the occlusal plane. If, as sometimes happens, only one side of the patient's musculature is tensioned, only the one lamp 90 at that side will be extinguished. The dentist can note this condition and take remedial action. The covers 82 containing batteries 84 will normally be removed during the preliminary steps of setting up the apparatus on the patient, in order to conserve the batteries. When the apparatus is set up and the dentist is ready to make the critical measurement, then the covers 82 and batteries 84 will be set in place so that both lamps light while the patient is relaxed. The dentist may test the setting by having the patient bite or tense his lower jaw whereupon the lighted lamps should go out.

Figure 12:
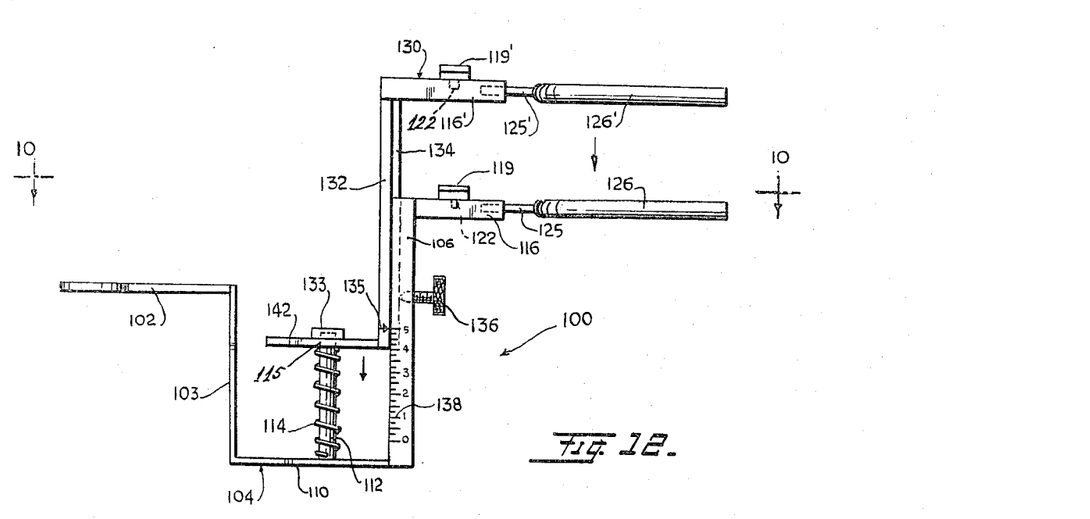
FIG. 12 is a side view of a maxillary mandibular occlusator device.
Figure 13:
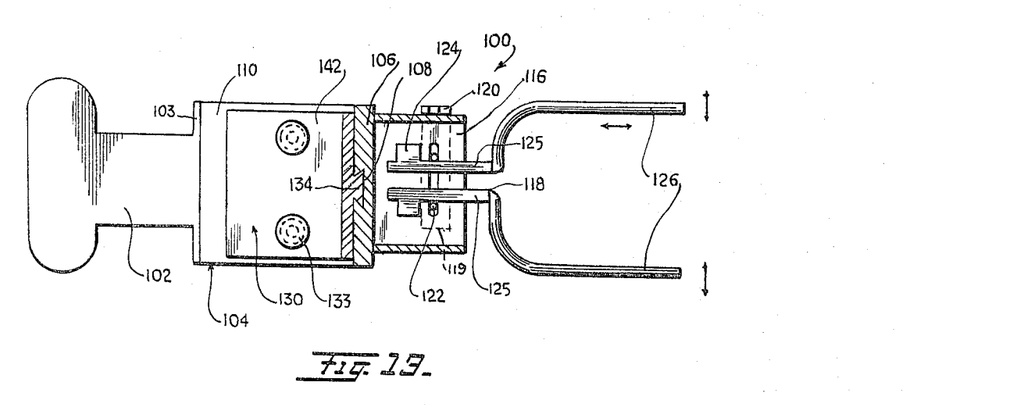
FIG. 13 is a top plan view of the device of FIG. 12.

The apparatus includes an occlusator device 100 shown in FIGS. 1, 12 and 13. This device has a handle 102 formed at one end of arm 103 of a generally U-shaped frame member 104. The frame member has an upright plate 106 formed with a vertical dovetail groove 108 on its inner side. On the flat, horizontal bight plate section 110 of the frame are two posts or shafts 112 on which are coil springs 114. On the upper end of plate 106 is an outwardly extending flat tubular sleeve 116. In the underside of the sleeve is a slot 118. A bar 119 is pivotally secured by a hinge 120 to one lateral edge of the sleeve. This bar carries pins 122 which can enter slot 118 for engagement with heads 124 formed in flat ends 125 of removable fingers 126. Each of the fingers 126 is formed of stiff wire and is bent laterally outward of its end 125.

A second frame member 130 has an upright plate 132 formed with a dovetail ridge 134 which fits slidably in groove 108. The frame member 130 can be secured in fixed position with respect to frame member 104 by a setscrew 136 carried by plate 106 in hole 139. On each lateral edge of plate 132 is an index 135 which moves along a graduated scale 138 on the side edge of plate 106. Another flat, horizontal sleeve 116' extends out of the upper end of plate 132 parallel to sleeve 116. The index 135 and scale 138 indicate the spacing between these two sleeves.

Sleeve 116' may carry two other removable fingers 126'. The heads of flat ends 125' of these fingers can be fitted into sleve 116' for engagement by pins 122' on bar 119' pivotally secured to one lateral edge of the sleeve. Sleeve 116' has a slot similar to slot 118 to receive pins 122'. The fingers 126 and 126' can be moved in spaced horizontal planes in the respective sleeves but cannot come out of the sleeves unless the bars 119, 119' are opened. The fingers in each pair can be turned independently inwardly toward each other or outwardly away from each other.

The upper ends of the stationary posts 112 extend through holes 115 in a short horizontal plate 142 extending outwardly of the bottom end of plate 132 parallel to plate 110. A head or knob 133 is removably secured to the top of each post above plate 142. The two knobs limit upward movement of the frame member 130. The frame member 130 can be moved downwardly to bring the sleeves 116' closer to sleeve 116 against tension in springs 114.

Figures 14, 19:
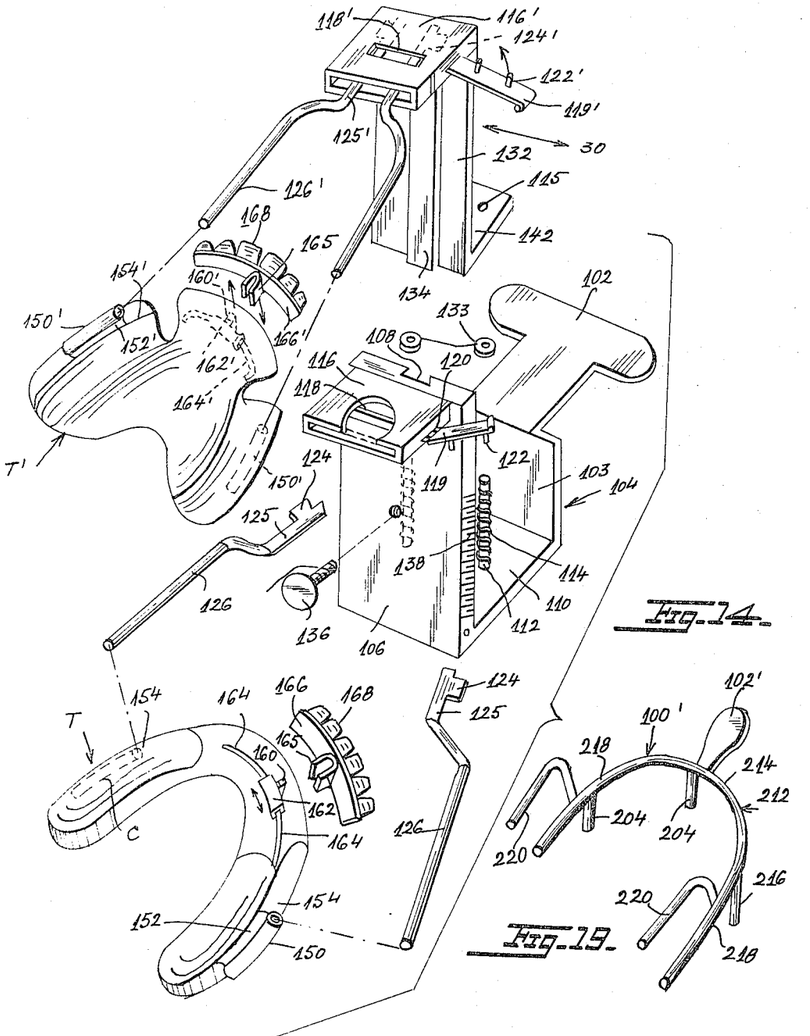
FIG. 14 is an exploded perspective view of parts of the device of FIGS. 12 and 13, with associated dental trays and artificial denture.
FIG. 19 is a top perspective view of a modified form of stud assembly.

The free ends of fingers 126 can be inserted into tubular fittings 150 at the sides of a molded wax or plastic impression T of a patient's lower gum; see FIG. 14. Each fitting has a lateral plate element 152 which can be secured by wax 154 to the impression. Similarly, the free ends of fingers 126' can be inserted into tubular fittings 150' with plate elements 152' held by wax 154' at the sides of a molded wax or plastic impression T' of a patient's upper gum.

A stud 160 is provided for locating the central plane of symmetry of a patient's dentition. This stud has the form of a platelet. Attached to the stud 160 is a clip 162 carrying a pair of laterally extending pins or a wire 164 which can be secured to the front end of impression T. The stud can receive a channel-shaped member 165 formed on the rear side of a bar 166 which supports artificial front teeth 168. Another wire 164' supporting clip 162' and stud 160' can be provided for the front end of impression T'.

In order to use the apparatus in the process of making full or partial artificial dentures, the dentist will make a plaster cast of the lower gum G and upper gum G' of the patient for use in an articulator at a dental laboratory. Such an articulator would form no part of the present invention and its construction need not be described here. It is sufficient to state that it is a hinged structure in which plaster casts of a patient's dentition can be mounted for fitting artificial dentures thereto.

The dentist will then make separate snap impressions T and T' of lower and upper gums. These impressions may be made of quick setting wax or plastic material. If the patient has any natural teeth or permanent bridgework the top surface of the lower impression T and the bottom surface of the upper impression T' should be no higher than the grinding or biting occlusal surfaces of these teeth. If the patient has no teeth then the upper surface S of the lower impression T and the lower surface S' of the upper impression T' should at some opposing points P, P' be spaced from the gums at positions corresponding to occulsal biting or grinding points of the patient's dentition. When the wax or plastic impressions T and T' are set they are removed from the patient's mouth and the tubular fittings 150 and 150' are applied at the sides of the impressions. These fittings should be spaced away from the occlusal points P and P' so as not to interfere with occlusion of these points. The dentist then mounts the upper impression T' upon fingers 126' of the occlusator 100 and mounts the lower impression T upon the lower fingers 126.

The dentist then fits the headset H upon the patient's head and adjusts band 20 so that it extends over the head of the patient in a vertical plane including the maxillary-mandibular joints. The rod 28 and crank handle 30 are placed in the positions shown in FIG. 1. The muscular tension indicators 50 are placed in contact with the patient's cheeks with inwardly projecting plugs movable just below the patient's cheekbones. Fixed plugs 62 bear against the patient's cheekbones and movable plugs 61 bear against the mandibular musculature below the cheekbones at the sides of the patient's face. The covers 82 with batteries 84 are applied and lamps 90 should be lighted when the lower jaw is relaxed. The lamps should go out when the lower jaw is tensioned sufficiently to expand the mandibular musculature.

The dentist then inserts the two impressions T, T' in the patient's open mouth by means of the occlusator 100, in the manner shown in FIG. 1. The upper fingers 126' of the occlusator support the upper impression T' and hold it in place while the lower impression T fits snugly on the lower gum G. The spring 114 will be compressed and this spring tending to expand will raise the upper tray member 130 to hold impression T' on the upper gum G'. The setscrew 136 will be loosened. The patient will relax the muscles of the lower jaw. The dentist will then close the patient's lower jaw with one hand while holding the occlusator with the other hand. The lighted lamps 90 will indicate continuously that the patient's lower jaw and the mandibular musculature are relaxed. When the dentist determines that two points P and P' of the impressions are in contact, he will tighten setscrew 136, and will note and record the indication of index 135 on scale 138. This reading is a measure of the spacing of fingers 126 and 126' when the patient's dentition is in natural occlusion. The bars 119 and 119' can now be opened to release the fingers 126, 126' and the occlusator 100 can be withdrawn leaving the fingers still engaged in fittings 150, 150'.

Then the released fingers can be withdrawn from the fittings.

The patient's mouth is now closed and jaws remain relaxed. This is still being indicated by the lighted lamps 90. The dentist then clamps channel shaped member 165 over the flat end 35 of the crank handle 30 and swings the crank handle 30 downwardly as indicated by the arrows in FIG. 1. The leg 32 of the crank handle is then advanced axially between the patient's lips until plate 166 with teeth 168 contacts the forward end of impression T. The dentist attaches the plate 166 to the impression T by means of wax, leaving the channel shaped member 165 disposed in a vertical plane and extending forwardly. Then the dentist withdraws the tool 35 by retracting the crank handle 30 and repeats the procedure to mount plate 166' with member 165' on impression T' in vertical alignment with plate 166 and member 165. This completes the use of the apparatus on the patient. The headset can now be removed and the batteries 84 and covers 82 will be removed from the indicators 50.

Figure 15:
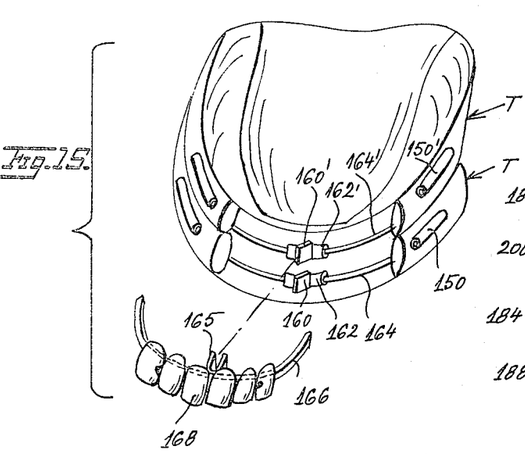
FIG. 15 is a top perspective view of upper and lower impressions in biting position with an assembly of artificial front teeth preparatory to mounting thereon.
Figures 16, 17:
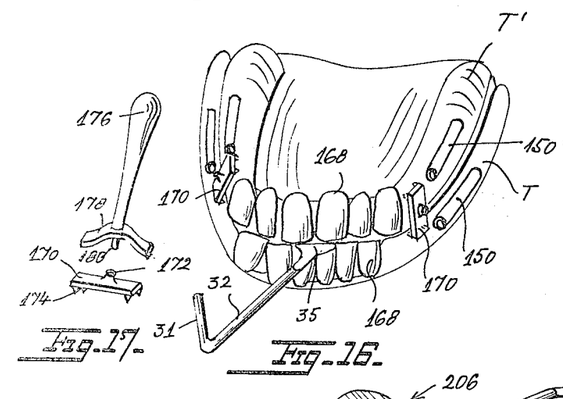
FIG. 16 is a similar view but showing assemblies of artificial front teeth in position on the impressions, with a mounting tool between the teeth and showing the impressions locked in position.
FIG. 17 is a disassembled view of a clamping lock of FIG. 17 and mounting tool.

In FIG. 15, the lower and upper impressions T and T', respectively, are shown in position with the fingers 164 and 164' attached with the studs 160 and 160' in alignment and extending forwardly, preparatory to mounting assemblies of artificial teeth 168 are shown in FIG. 16. When the assemblies of artificial teeth are mounted, the impressions T and T' are locked together by clamps in the form of rectangular plates 170 having a central socket 172 and depending prongs 174 adapted to be inserted into the material of the impressions, with the plates disposed across the space between the impressions as shown in FIG. 16. In FIG. 17, a tool for mounting the clamp is shown consisting of an elongated handle 176 with crosspiece 178 at one end thereof and a protruding stud 180 below the cross piece adapted to be inserted into the socket 172 of the plate.

The impressions T and T' can now be sent to a dental laboratory together with the critical reading obtained from scale 138. At the dental laboratory, a dental technician will mount the plaster casts of the patient's gums in a conventional articulator. He then attaches the impressions T and T' to the plaster casts by any suitable adhesive. The dental technician can then proceed to fit artificial teeth to the impressions T and T' in conventional manner. He will test for proper occlusion by employing another occlusator 100. When the articulator is closed with impressions T and T' in place, he will insert fiingers 126, 126' in tubular fittings 150, 150' and will engage ends 125, 125' in sleeves 116, 116'. The frame members 104, 130 will be set so that the index 135 is at the same reading on scale 138 as recorded by the dentist. When the occlusator is at this scale reading and engaged with impressions T, T' the artificial teeth in the closed technician's articulator will be in proper occlusion. The studs 160, 160' can be used for fitting assemblies of artificial front teeth 168 upon the impressions T, T'.

It will be apparent that the apparatus described makes it possible to determine the natural occlusion of the patient's bite when his mandibular musculature is in properly relaxed and untensioned condition. The locations of the fixed fittings 150, 150' in the impressions T, T' and the reading of scale 138 provide sufficient information to enable the dental laboratory to duplicate the natural occlusion in the laboratory articulator. The locations of the studs 160 and 160' determine precisely the plane of symmetry bisecting the medial occlusal plane.

Figure 18:
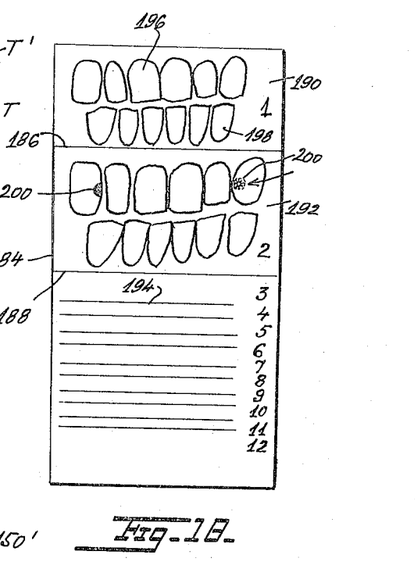
FIG. 18 is a top plan view of a selective chart used by dentists in practice.

In FIG. 18, a selective chart used by dentists in practice is illustrated consisting of a rectangular shaped card 184 divided by horizontal lines 186 and 188 into wide spaces 190 and 192 marked with the numerals "1" and "2" respectively, and by horizontal lines 194 into narrow spaces marked from "3" to "12" consecutively. In space "1" there are representations of sets of upper and lower teeth 196, 198, respectively, of a patient, and in space "2" the same representations are shown but with marks 200 thereon where attention is needed. The narrow spaces are for recording memoranda concerning the teeth shown above.

Figure 21:
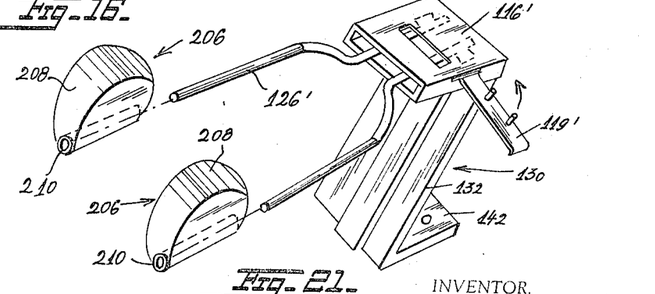
FIG. 21 is a top perspective disassembled view of another modification of the invention.

If the original teeth are in the patient's mouth, it is necessary to use safety pads and for this purpose safety pad supports 206 are shown in FIG. 21, each having a semi-circular tapering body 208 with a tubular fitting 210, constituting the narrow straight base of the body. The supports are slipped over the fingers 126' of the frame member 130 of the occlusator device 100 for insertion into the mouth.

In FIG. 19, a modified form of occlusator device 100' is shown. This device 100' comprises a U-shaped wire body 212, slightly curved, with an integral handle 102' extending from the bight portion 214 of the body. Posts 216, 204 depend from the legs 218, 218 of the body and from the bight portion 214 for spacing the device. A pair of angular fingers 220 are fastened to the leg portion and extend laterally and then in parallelism with the leg portions for insertion into the fixed fittings 150, 150' on the impressions T, T'.

Figure 20:
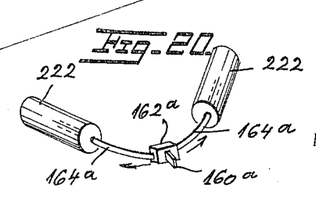
FIG. 20 is a top perspective view of a modified form of stud assembly.

FIG. 20 illustrates a modified form of stud assembly including a stud 160a, a clip 162a mounting said stud and carrying a pair of laterally extending pins or wires 164a for securing the assembly to the front end of an impression. A pair of cylindrical members 222, 222 is carried on the ends of the pins or wires forming extensions thereof to facilitate attachment to the impression.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. Dental apparatus for determining natural occlusion in making artificial dentures, comprising a headset including a band for extending in a vertical plane over the head of a patient, a pair of muscular tension indicators mounted at lower ends respectively of the band, each of said tension indicators including a fixed member disposable in contact with a patient's cheekbone and including at least one movable plug disposable in contact with a maxillary-mandibular joint at one side of a patient's face, signal means in each indicator operated by said movable plug for indicating when musculature at said joint expands upon tensioning of said musculature and for indicating when said musculature is in a relaxed condition, a semicircular second band disposed in a plane perpendicular to the first-named band and secured at opposite ends to the first-named band, a socket on the second band, a rod secured in said socket, a crank handle swingably connected to said rod, said handle having a leg movable in a horizontal direction when the handle is swung, and means at one end of the shaft for locating a vertical plane of symmetry at front ends of the patient's gums.

2. Dental apparatus for determining natural occlusion in making artificial dentures, comprising a headset including a band for extending in a vertical plane over the head of a patient, a pair of muscular tension indicators mounted at lower ends respectively of the band, each of said tension indicators including a fixed member disposable in contact with a patient's cheekbone and including at least one movable plug disposable in contact with a maxillary-mandibular joint at one side of a patient's face, and signal means in each indicator operated by said movable plug for indicating when musculature at said joint expands upon tensioning of said musculature and for indicating when said musculature is in a relaxed condition; an occlusator including a pair of slidably engaged frame members, a first pair of coplanar fingers movable in a first horizontal plane while engaged by one of the frame members, a second pair of coplanar fingers movable in a second horizontal plane while engaged by the other frame members, spring means on the frame members tending to bias the frame members apart, scale means on the frame members for indicating vertical spacing between the first and second horizontal planes, a pair of plastic impressions of the patient's upper and lower gums respectively, tubular fittings mounted on opposite sides of said impressions, said fingers having free ends engaged in the tubular fittings for holding said impressions in place on the patient's gums, whereby said scale provides an indication of the patient's natural medial occlusal plane when opposing points on said impressions are in contact while the impressions are held by the occlusator on the patient's gums, and while said signal means of the tension indicators indicate that the patient's musculature is in a fully relaxed condition.

3. Dental apparatus for determining natural occlusion in making artificial dentures, comprising a headset including a band for extending in a vertical plane over the head of a patient, a pair of muscular tension indicators mounted at lower ends respectively of the band, each of said tension indicators including a fixed member disposable in contact with a patient's cheekbone and including at least one movable plug disposable in contact with a maxillary-mandibular joint at one side of a patient's face, signal means in each indicator operated by said movable plug for indicating when musculature at said joint expands upon tensioning of said musculature and for indicating when said musculature is in a relaxed condition, a semicircular second band disposed in a plane perpendicular to the first-named band and secured at opposite ends to the first-named band, a socket on the second band, a rod secured in said socket, a crank swingably connected to said rod, said handle having a leg movable in a horizontal direction when the handle is swung, and means at one end of the shaft for locating a vertical plane of symmetry at front ends of the patient's gums; an occlusator including a pair of slidably engaged frame members, a first pair of coplanar fingers movable in a first horizontal plane while engaged by one of the frame members, a second pair of coplanar fingers movable in a second horizontal plane while engaged by the other frame members, spring means on the frame members, tending to bias the frame members apart, scale means on the frame members for indicating vertical spacing between the first and second horizontal planes, a pair of plastic impressions of the patient's upper and lower gums respectively, tubular fittings mounted on opposite sides of said impressions, said fingers having free ends engaged in the tubular fittings for holding said impressions in place on the patient's gums, whereby said scale provides an indication of the patient's natural medial occlusal plane when opposing points on said impressions are in contact while the impressions are held by the occlusator on the patient's gums, and while said signal means of the tension indicators indicate that the patient's musculature is in a fully relaxed condition.

4. Dental apparatus for determining natural occlusion in making artificial dentures, comprising a headset including a band adjustable lengthwise for extending in a vertical plane over the head of a patient, a pair of muscular tension indicators, means mounting said indicators at lower ends of said band, the last-named means including spring biased shafts for adjustably moving the indicators horizontally, each of the tension indicators including a casing, a fixed plug member carried by the casing for juxtaposition to a cheekbone of the patient, at least one movable plug member carried by the casing for juxtaposition to a maxillary-mandibular joint at one side of the patient's face under a cheekbone, signal means in each indicator operated by said movable plug for indicating when the mandibular musculature at said joint expands upon tensioning of said musculature and for indicating when said musculature is in a relaxed condition, a semicircular second band disposed in a plane perpendicular to the first-named band and secured at opposite ends to the first-named band, a socket on the second band, a rod secured in said socket, a crank handle swingably connected to said rod, said handle having a leg movable in a horizontal direction when the handle is swung, and means at one end of the shaft for locating a vertical plane of symmetry at front ends of the patient's gums.

5. Dental apparatus for determining natural occlusion in making artificial dentures, comprising a headset including a band adjustable lengthwise for extending in a vertical plane over the head of a patient, a pair of muscular tension indicators, means mounting said indicators at lower ends of said band, the last-named means including spring biased shafts for adjustably moving the indicators horizontally whereby the indicators can be abutted snugly against opposite sides of the patient's face, each of the tension indicators including a casing, a fixed plug member carried by the casing for juxtaposition to a cheekbone of the patient, at least one movable plug member carried by the casing for juxtaposition to a maxillary-mandibular joint at one side of the patient's face under a cheekbone, a movable member carried by said casing, said movable plug being connected to said movable member for moving the same, a cover removably mounted on said movable member, a battery in said cover, signal means including a lamp mounted in a fixed position on said casing, circuit terminals contacting terminals of said lamp, said battery having other terminals contacting the circuit terminals for lighting the lamp when said movable plug extends away from the casing in a normal first position, whereby said lamp is extinguished by separating the circuit terminals and said other terminals when the movable plug is moved toward the casing by expansion of said joint upon tensioning of the mandibular musculature thereat, a semicircular second band disposed in a plane perpendicular to the first-named band and secured at opposite ends to the first-named band, a socket on the second band, a rod secured in said socket, a crank handle swingably connected to said rod, said handle having a leg movable in a horizontal direction when the handle is swung, and means at one end of the shaft for locating a vertical plane of symmetry at front ends of the patient's gums.

6. Dental apparatus for determining natural occlusion in making artificial dentures, comprising a headset including a band adjustable lengthwise for extending in a vertical plane over the head of a patient, a pair of muscular tension indicators, means mounting said indicators at lower ends of said band, the last-named means including spring biased shafts for adjustably moving the indicators horizontally whereby the indicators can be abutted snugly against opposite sides of the patient's face, each of the tension indicators including a casing, a fixed plug member carried by the casing for juxtaposition to a cheekbone of the patient, at least one movable plug member carried by the casing for juxtaposition to a maxillary-mandibular joint at one side of the patient's face under a cheekbone, signal means in each indicator operated by said movable plug for indicating when the mandibular musculature at said joint expands upon tensioning of said musculature and for indicating when said musculature is in a relaxed condition; an occlusator including a pair of slidably engaged frame members, spring means on the frame members tending to bias the same apart, a first pair of co-planar fingers, first clamp means on one frame member disengageably holding one end of each of the fingers while permitting the same to be moved with respect to each other in a first horizontal plane, a second pair of coplanar fingers, second clamp means on the other frame member disengageably holding one end of each of the other fingers while permitting the same to be moved with respect to each other in a second horizontal plane spaced from the first horizontal plane, and scale means on the frame members for measuring the spacing between said first and second horizontal planes to indicate the location of the patient's natural medial occlusal plane, said fingers having free ends for engaging fittings on plastic impressions of the patient's gums while the frame members hold said impressions in place and while the signal means of the tension indicators indicate that the patient's mandibular musculature is in a fully relaxed condition.

7. Dental apparatus for determining natural occlusion in making artificial dentures, comprising a headset including a band adjustable lengthwise for extending in a vertical plane over the head of a patient, a pair of muscular tension indicators, means mounting said indicators at lower ends of said band, the last-named means including spring biased shafts for adjustably moving the indicators horizontally whereby the indicators can be abutted snugly against opposite sides of the patient's face, each of the tension indicators including a casing, a fixed plug member carried by the casing for juxtaposition to a cheekbone of the patient, at least one movable plug member carried by the casing for juxtaposition to a maxillary-mandibular joint at one side of the patient's face under a cheekbone, a movable member carried by said casing, said movable plug being connected to said movable member for moving the same, a cover removably mounted on said movable member, a battery in said cover, signal means including a lamp mounted in a fixed position on said casing, circuit terminals contacting terminals of said lamp, said battery having other terminals contacting the circuit terminals for lighting the lamp when said movable plug extends away from the casing in a normal first position, whereby said lamp is extinguished by separating the circuit terminals and said other terminals when the movable plug is moved toward the casing by expansion of said joint upon tensioning of the mandibular musculature thereat; an occlusator including a pair of slidably engaged frame members, spring means on the frame members tending to bias the same apart, a first pair of coplanar fingers, first clamp means on one frame member disengageably holding one end of each of the fingers while permitting the same to be moved with respect to each other in a first horizontal plane, a second pair of coplanar fingers, second clamp meas on the other frame member disengageably holding one end of each of the other fingers while permitting the same to be moved with respect to each other in a second horizontal plane spaced from the first horizontal plane, and scale means on the frame members for measuring the spacing between said first and second horizontal planes to indicate the location of the patient's natural medial occlusal plane, said fingers having free ends for engaging fittings on plastic impressions of the patient's gums while the frame members hold said impressions in place and while the signal means of the tension indicators indicate that the patient's mandibular musculature is in a fully relaxed condition.

8. Dental apparatus for determining natural occlusion in making artificial dentures, comprising a headset including a band adjustable lengthwise for extending in a vertical plane over the head of a patient, a pair of muscular tension indicators, means mounting said indicators at lower ends of said band, the last-named means including spring biased shafts for adjustably moving the indicators horizontally whereby the indicators can be abutted snugly against opposite sides of the patient's face, each of the tension indicators including a casing, a fixed plug member carried by the casing for juxtaposition to a cheekbone of the patient, at least one movable plug member carried by the casing for juxtaposition to a maxillary-mandibular joint at one side of the patient's face under a cheekbone, a movable member carried by said casing, said movable plug being connected to said movable member for moving the same, a cover removably mounted on said movable member, a battery in said cover, signal means including a lamp mounted in a fixed position on said casing, circuit terminals contacting terminals of said lamp, said battery having other terminals contacting the circuit terminals for lighting the lamp when said movable plug extends away from the casing in a normal first position, whereby said lamp is extinguished by separating the circuit terminals and said other terminals when the movable plug is moved toward the casing by expansion of said mandibular joint upon tensioning of the mandibular musculature thereat, a semicircular second band disposed in a plane perpendicular to the first-named band and secured at opposite ends to the first-named band, a socket on the second band, a rod secured in said socket, a crank handle swingably connected to said rod, said handle having a leg movable in a horizontal direction when the handle is swung, means at one end of the shaft for locating a vertical plane of symmetry at front ends of the patient's gums; an occlusator including a pair of slidably engaged frame members, spring means on the frame members tending to bias the same apart, a first pair of coplanar fingers first clamp means on one frame member disengageably holding one end of each of the fingers while permitting the same to be moved with respect to each other in a first horizontal plane, a second plane of coplanar fingers, second clamp means on the other frame member disengageably holding one end of each of the other fingers while permitting the same to be moved with respect to each other in a second horizontal plane spaced from the first horizontal plane, and scale means on the frame members for measuring the spacing between said first and second horizontal planes to indicate the location of the patient's natural medial occlusal plane, said fingers having free ends for engaging fittings on plastic impressions of the patient's gums while the frame members hold said impressions in place and while the signal means of the tension indicators indicate that the patient's mandibular musculature is in a fully relaxed condition.

9. Dental apparatus for determining natural occlusion in making aritificial dentures, comprising a headset including a band for extending in a vertical plane over the head of a patient, a pair of muscular tension indicators mounted at lower ends respectively of the band, each of said tension indicators including a fixed member disposable in contact with a patient's cheekbone and including at least one movable plug disposable in contact with a maxillary-mandibular joint at one side of a patient's face, signal means in each indicator operated by said movable plug for indicating when musculature at said joint expands upon tensioning of said musculature and for indicating when said musculature is in a relaxed condition; an occlusator including a pair of slidably engaged frame members, spring means on the frame members tending to bias the same apart, a first pair of coplanar fingers, first clamp means on one frame member disengageably holding one end of each of the fingers while permitting the same to be moved with respect to each other in a first horizontal plane, a second pair of coplanar fingers, second clamp means on the other frame member disengageably holding one end of each of the other fingers while permitting the same to be moved with respect to each other in a second horizontal plane spaced from the first horizontal plane, and scale means on the frame members for measuring the spacing between said first and second horizontal planes to indicate the location of the patient's natural medial occlusal plane, said fingers having free ends for engaging fittings on plastic impressions of the patient's gums while the frame members hold said impressions in place and while the signal means of the tension indicators indicate that the patient's mandibular musculature is in a fully relaxed condition.

10. An occlusator for use with signal means indicating the state of tension in mandibular musculature of a patient, comprising a pair of slidably engaged frame members, spring means on the frame members tending to bias the same apart, a first pair of coplanar fingers, first clamp means on one frame member disengageably holding one end of each of the fingers while permitting the same to be moved with respect to each other in a first horizontal plane, a second pair of coplanar fingers, second clamp means on the other frame member disengageably holding one end of each of the other fingers while permitting the same to be moved with respect to each other in a second horizontal plane spaced from the first horizontal plane, and scale means on the frame members for measuring the spacing between said first and second horizontal planes to indicate the location of the patient's natural medial occlusal plane, said fingers having free ends for engaging fittings on plastic impressions of the patient's gums while the frame members hold said impressions in place and while said signal means indicate that the patient's mandibular musculature is in a fully relaxed condition.

11. An occlusator for use with signal means indicating the state of tension in mandibular musculature of a patient, comprising a pair of slidably engaged frame members, spring means on the frame members tending to bias the same apart, a first pair of coplanar fingers, first clamp means on one frame member disengageably holding one end of each of the fingers while permitting the same to be moved with respect to each other in a first horizontal plane, a second pair of coplanar fingers, second clamp means on the other frame member disengageably holding one end of each of the other fingers while permitting the same to be moved with respect to each other in a second horizontal plane spaced from the first horizontal plane, and scale means on the frame members for measuring the spacing between said first and second horizontal planes to indicate the location of the patient's natural medial occlusal plane, a pair of plastic impressions of the patient's upper and lower gums respectively, tubular fittings mounted on opposite sides of said impressions, said fingers having free ends engaged in the tubular fittings for holding said impressions in place on the patient's gums while said signal means indicate that the patient's mandibular musculature is in a fully relaxed condition.

12. An occlusator for use with signal means indicating the state of tension in mandibular musculature of a patient, comprising a pair of slidably engaged frame members, spring means on the frame members tending to bias the same apart, a first pair of coplanar fingers, first clamp means on one frame member disengageably holding one end of each of the fingers while permitting the same to be moved with respect to each other in a first horizontal plane, a second pair of coplanar fingers, second clamp means on the other frame member disengageably holding one end of each of the other fingers while permitting the same to be moved with respect to each other in a second horizontal plane spaced from the first horizontal plane, and scale means on the frame members for measuring the spacing between said first and second horizontal planes to indicate the location of the patient's natural medial occlusal plane, said fingers having free ends, and safety pad supports on the free ends of the fingers.

13. Dental apparatus as defined in claim 2, characterized by means for locking the pair of plastic impressions together, said locking means including an elongated rectangular clamping plate with prongs depending from the corners thereof secured in the material of the impressions.

14. As an article of manufacture, an occulsator comprising a U-shaped wire body slightly curved, a handle projecting from the bight portion of the body, spaced posts depending from the body, and a pair of fingers supported on the legs of the body, said fingers being disposed spaced from the legs and in parallelism therewith.

15. A stud assembly for use with dental apparatus for determining natural occlusion in making artificial dentures, said stud assembly comprising a curved wire body, a clip mounted midway the ends of the body, a stud projecting radially of said clip and cylindrical members mounted on the free ends of the wire body.

References Cited
UNITED STATES PATENTS

| | | | |
|---|---|---|---|
| 2,411,194 | 11/1946 | DeRome | 32—19 |
| 2,543,512 | 2/1951 | Shapiro | 32—19 |

LOUIS G. MANCENE, *Primary Examiner.*

RICHARD A. GAUDET, R. E. MORGAN, *Examiners.*

S. NATTER, *Assistant Examiner.*